(12) United States Patent
Bennett et al.

(10) Patent No.: US 7,734,550 B1
(45) Date of Patent: Jun. 8, 2010

(54) METHOD AND SYSTEM FOR IDENTIFYING THE CONTROLLING LICENSE FOR INSTALLED SOFTWARE

(75) Inventors: Jim Bennett, Duvall, WA (US); Peter Oosterhof, Sammamish, WA (US); Aidan Hughes, Bellevue, WA (US); Anzhelika Nishanova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1486 days.

(21) Appl. No.: 10/681,028

(22) Filed: Oct. 7, 2003

(51) Int. Cl.
*G06F 21/00* (2006.01)
(52) U.S. Cl. .............. 705/59; 705/51; 705/57; 705/58
(58) Field of Classification Search .............. 705/59
See application file for complete search history.

(56) References Cited

U.S. PATENT DOCUMENTS 5,553,143 A * 9/1996 Ross et al. .............. 705/59
2002/0019814 A1 * 2/2002 Ganesan .............. 705/59
2002/0107809 A1 * 8/2002 Biddle et al. .............. 705/59

OTHER PUBLICATIONS

White, Ron. "How Computers Work," Millenium Edition. Que Corporation, Indianapolis, IN, Sep. 1999.*
Software Strategies: Software You Can Try Before You Buy/Software Economics Letter.

* cited by examiner

*Primary Examiner*—Andrew J. Fischer
*Assistant Examiner*—Joshua Murdough
(74) *Attorney, Agent, or Firm*—Merchant & Gould; Ryan T. Grace

(57) ABSTRACT

In accordance with other aspects, the present invention relates to a system for identifying a license for a first software product of a first type installed on a computer system having at least one other software product of the first type installed on the computer system. The system includes a first license associated with the first software product; at least one second license associated with the at least one other software product installed on the computer; and a license module that compares the first license and the at least one second license and selects one of the first and second licenses based on predetermined criteria. Methods for identifying and displaying a license for a first software product of a first type installed on a computer system are also disclosed.

21 Claims, 10 Drawing Sheets

METHOD AND SYSTEM FOR IDENTIFYING THE CONTROLLING LICENSE FOR INSTALLED SOFTWARE

TECHNICAL FIELD

The present invention relates to software on a computer and more particularly to a method and system for identifying a license agreement for an installed software product.

BACKGROUND OF THE INVENTION

Typically, software is not sold outright, but rather the users purchase licenses to use the software. Typically, each software product is provided with a license, referred to as an end-user license agreement (EULA), that the user must accept before installing or being granted access to the software product. The EULAs are important to the user because they describe the terms and conditions, such as how many computers it can be installed on, that are associated with the software product.

Identifying an appropriate EULA for a given software product has become difficult for users. EULAs are typically stored onto the computer in a text form when each software product is installed. Often, the EULAs do not specifically identify a product within the EULA because most EULAs are generically written so that they can be used with different software products and types. It is easy for the user to get confused and misidentify a EULA for a product.

A related problem is associated with multiple EULAs that could potentially apply to a software product. It has become common for computer users to have multiple versions of the same software products installed on their computer at any given time. This can happen for a number of reasons.

One main reason this occurs is due to the practice of providing software products as stand-alone products and also providing collections of software products (a practice referred to as "bundling") as a single bundled product. One common example of a bundled product is to sell an "office suite" product that may consist of separate professional versions of wordprocessing, spreadsheet, presentation, and communication applications (each of which may also be provided individually as stand-alone products). Often, because of the cost savings, a user may purchase the bundled product even though the user already has one or more of the software products in the bundle, because it is cheaper than purchasing the desired software products individually. A bundled product is often provided with its own EULA that applies to all the software products within the bundle. In this case, the user may end up with multiple different EULAs that potentially apply to the same software product.

For example, a user may purchase a computer with a limited use OEM version of a word processor stand-alone product already installed. This version of the word processor would be subject to an OEM EULA that may include terms relating to the computer manufacturer. Later, the user may purchase and install a full version of the same software product (possibly to get additional features or as an upgrade), now storing a full, perpetual EULA on the computer. Later, the user may install a trial version of a bundled product that contains the word processor with a trial EULA. At this point, there are three different EULAs on the computer that may apply to the software product.

Misidentification of the applicable EULA can cause problems both for the user and the computer manufacturer and software developers. The users can inadvertently overestimate the scope of their rights to a software product and violate the terms and conditions of their license. Alternatively, if the license terms (as often is the case) dictate who is responsible for certain problems that may arise with the software, misidentification of the EULA may cause the user to contact the wrong party when there is a problem.

It is with respect to these considerations and others that the present invention has been made.

SUMMARY OF THE INVENTION

In accordance with the present invention, the above and other problems are solved by providing a license, such as an end-user license agreement or EULA, with each installed software product in a protected form. The license may only be accessed in a controlled manner via a license module. The license module may be provided with each software product or provided as a separate software product. The license module is also capable of identifying software products of the same type on a computer system and selecting a best of the licenses for the software products when displaying the license for those software products.

In accordance with other aspects, the present invention relates to a system for identifying a license for a first software product of a first type installed on a computer system having at least one other software product of the first type installed on the computer system. The system includes a first license associated with the first software product; at least one second license associated with the at least one other software product installed on the computer; and a license module that compares the first license and the at least one second license and selects one of the first and second licenses based on predetermined criteria. The license module may include a graphical user interface module that receives user requests to display a license for the first software product. The license module may also include a searching module that searches the computer system and identifies installed software products of the first type. An identification module may further be provided that determines the first type of the software product. A comparing module in the license module identifies the second licenses for each of the other software products of the first type. The assigned rank associated with each license may be provided with each license, or stored in configuration data for the software product, such as in a registry. The licenses may be stored in an encoded form or some other protected form. The assigned rank associated with each license may be determined by a developer of the software products based on predetermined criteria which may include the term of the license. The license module may include a generation module that creates a displayable form of the selected license from a protected form for display to a user.

In accordance with still other aspects, the present invention relates to a method for identifying and displaying a license for a first software product of a first type installed on a computer system. The method includes storing a first license for the first software product and second licenses for other software products in a protected form on the computer system. Upon receiving a request to display the license of the software product, the first type of the first software product is identified. The computer system is searched for other software products of the same type. A license is selected from the license of all the software products of the same type based on a comparison of the licenses. The selection is made based on predetermined ranking criteria. A displayable form of the selected license is generated from the protected form and is displayed to the user.

In accordance with still other aspects, the present invention relates to methods and systems for displaying a license for a software product installed on a computer system. The license for the software product is stored in a protected form on the computer system. Requests are received by the software product to display the license of the software product. The software product then generates a displayable form of the license from the protected form. The displayable form is then displayed.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
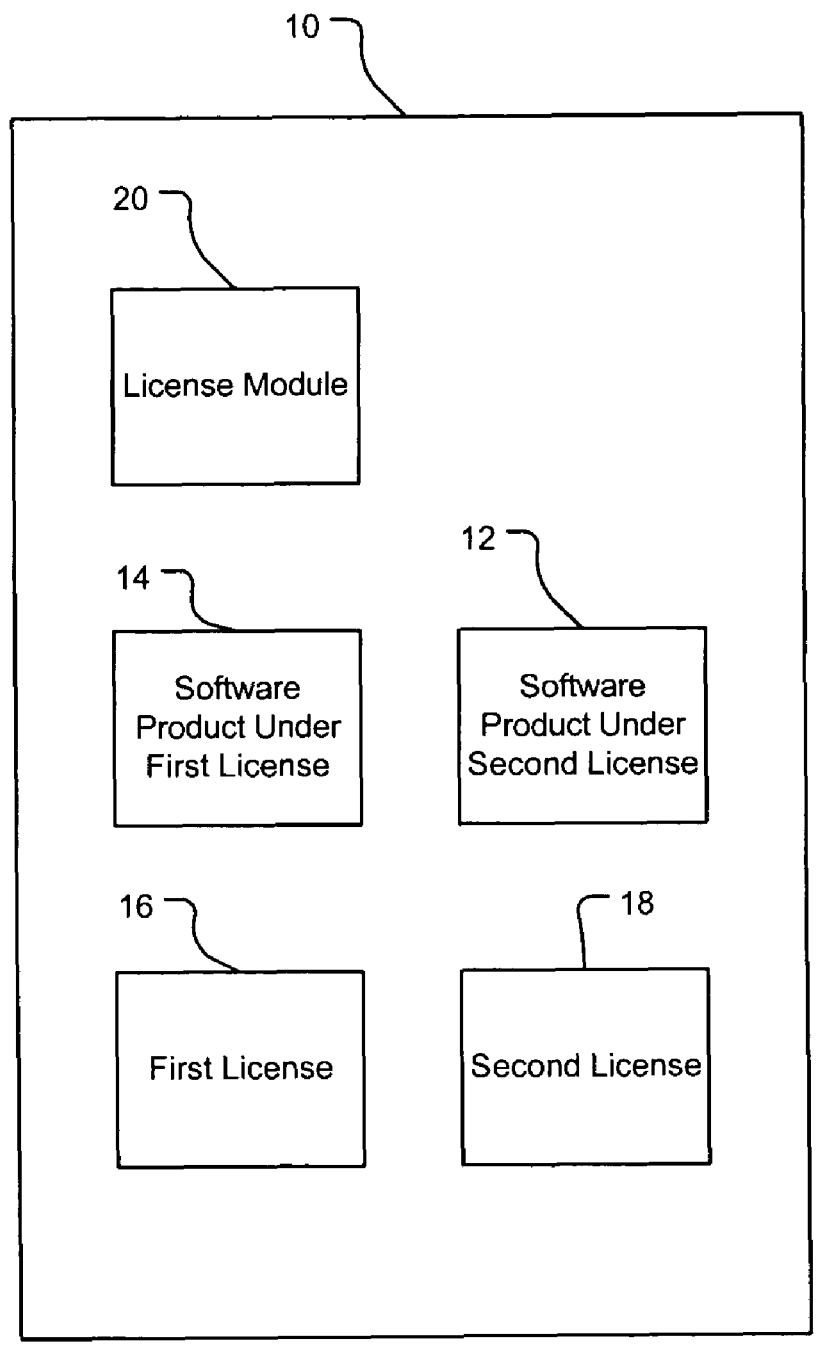
FIG. 1 illustrates the functional elements of a system for identifying a license for a software product according to one embodiment of the present invention.

FIG. 1 illustrates the functional elements of a system for identifying a license for a software product according to one embodiment of the present invention. In computer systems 10, there are often multiple software products 12 and 14 installed at one time. In the embodiment illustrated, two software products, a first software product 14 and a second software product 12, are installed on a computer system 10. Each installed software product 12 and 14 is associated with a different end-user license agreement (EULA) 16 and 18 that is also stored on the computer system 10. For the remainder of this specification the term "license" will be understood to be interchangeable with EULA. FIG. 1 shows only two installed software products for simplicity of discussion. Embodiments of the present invention are applicable to one or more installed software products.

Also installed on the computer system is a license module 20. The license module 20 may be implemented in a number of ways. In one embodiment, each software product 14 and 12 may include a license module 20 as part of the software product 14 and 12. In alternative embodiments, the license module 20 may be a separate and distinct software product or may be included as part of the computer system's operating system. For the remainder of this specification, the discussion shall generally be limited to the embodiment in which each of the two software products 12 and 14 is provided with its own license module 20.

In embodiments of the present invention, the EULAs 16 and 18 stored on the computer system 10 are stored in a protected form. The protected form prevents a user from accessing and displaying a EULA 16 and 18 in an unintended way. In the embodiment shown, the EULAs 16 and 18 can only be displayed via the license module. Any license module 20 can display any of the EULAs 16 and 18, but clearly identifies each displayed EULA 16 and 18 with a specific software product 12 and 14. This prevents a user from incorrectly identifying a EULA 16 and 18 with the wrong software product. In one embodiment, the EULAs 16 and 18 are stored in an encoded form that can only be decoded by the license module in a software product. Upon receipt of a user request, a software product 12 and 14 can, via its license module 20, identify its encoded EULA 16 and 18, decode it, and then display it to the user. Thus, in the embodiment the only way for the user to view a EULA 16 and 18 associated with an installed software product 12 and 14 is through the software product's license module 20.

As discussed above, it is possible for multiple versions, each with different EULAs 16 and 18, of the same type of software product 12 and 14 to be installed on the computer system 10 at one time. In embodiments of the present invention, the EULAs 16 and 18 stored on the computer system 10 may be assigned a relative rank for comparison to other EULAs 16 and 18 that could potentially apply to a software product 12 or 14. The rank and ranking scale may be predetermined by the software developer. Again, the EULAs 16 and 18 can only be displayed via a license module 20. The license module 20, as part of the displaying process, identifies all of the potentially applicable EULAs 16 and 18 by identifying all like versions of the software product 12 and 14 currently installed on the computing system. The predetermined ranks of each of the identified EULAs 16 and 18 are then compared and the EULA with the highest rank is displayed. In the embodiment, the highest rank corresponds to the best license (i.e. the license with the longest term, or allowing the most number of computer installations) based on some ranking criteria, such as length of use or number of computers installations, used by the software developer during the ranking process. Thus, the license module 20 automatically determines the best applicable license to the software product 12 and 14 and displays it.

Figure 2:
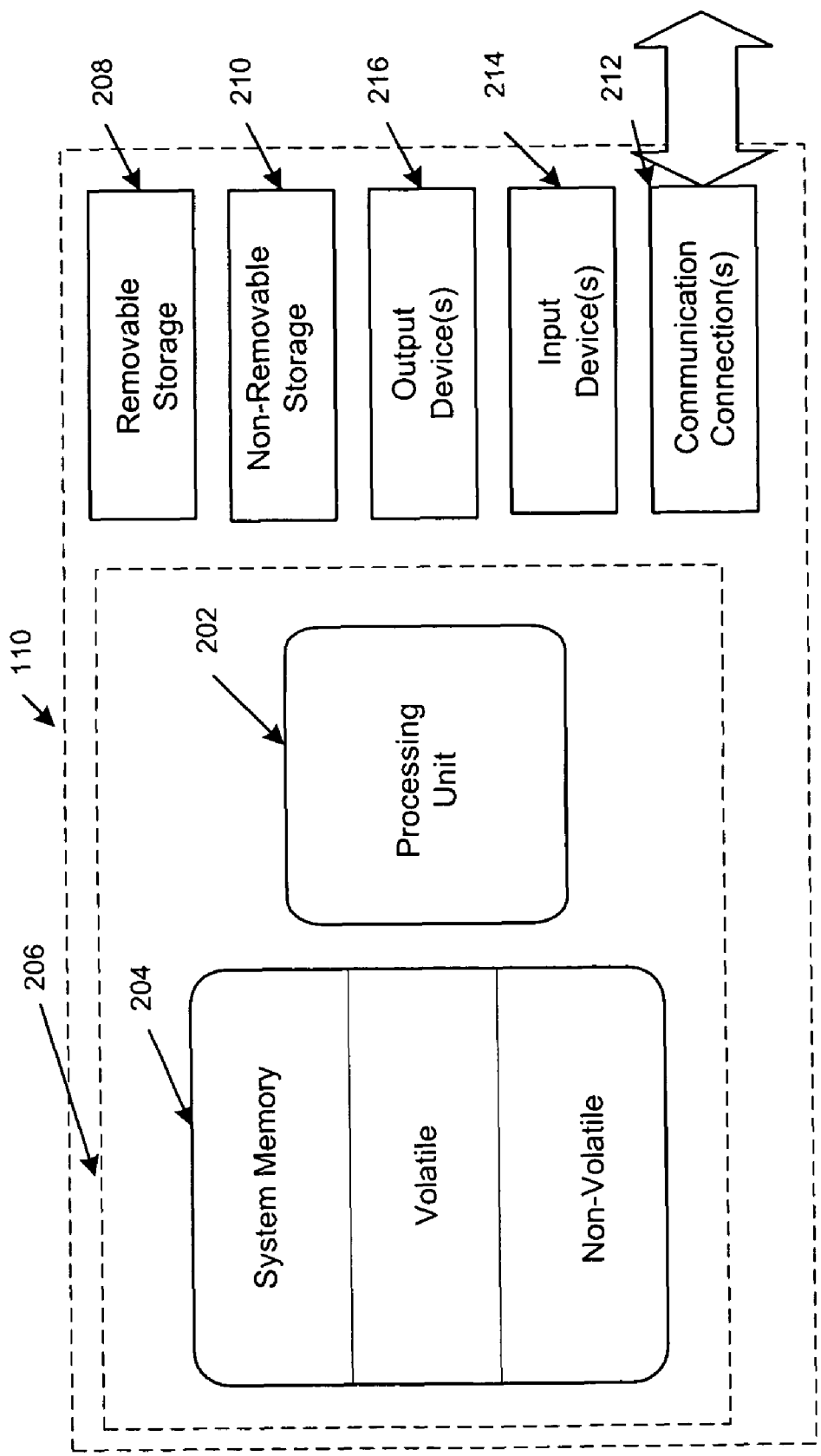
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to function as a server providing a website service. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, system 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
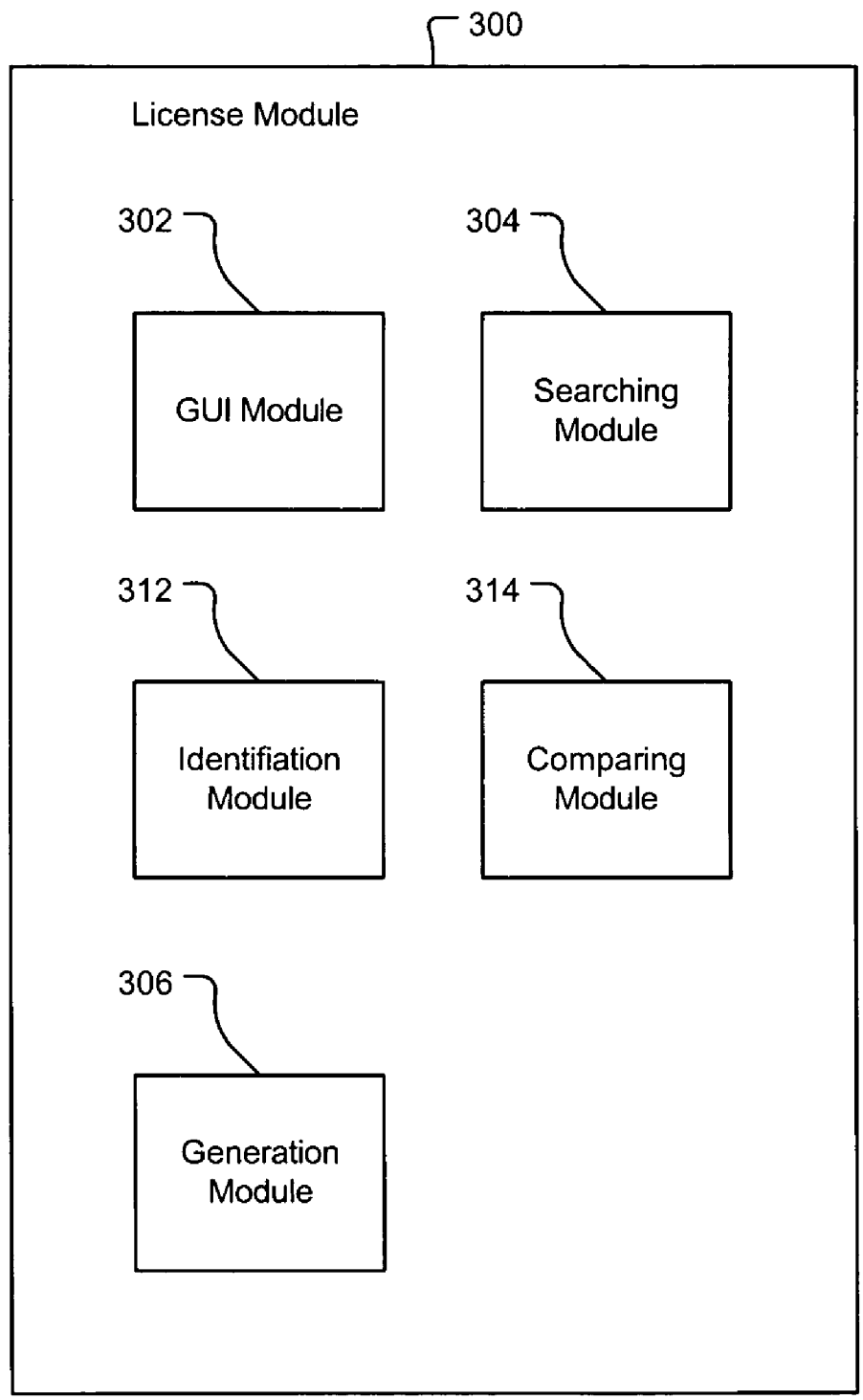
FIG. 3 illustrates an embodiment of a license module in accordance with the present invention.

FIG. 3 illustrates an embodiment of a license module 300 in accordance with the present invention. The license module 300, as discussed above, may be implemented as a stand-alone software product or may be included as part of other software products. When provided as part of a software product, the license module 300 could, for example, be accessed when a user makes a selection from operations listed in a menu, the selected operation regarding the license of the software product. One possibility may be selecting a "Help" menu, then the "About" operation and selecting a "Display License" or "Print License" operation under the "About" operation.

The license module 300 includes a graphical user interface (GUI) module 302. The GUI module 302 provides a GUI for receiving commands from and displaying information to a user. For example, the GUIs displayed to the user after the user selects a "Display License" operation as discussed above would be provided by the GUI module 302. The GUIs may include screens for displaying the license, as well as additional screens for other purposes.

Another module provided as part of the license module 300 is an identification module 312. Upon receipt of a user command to display the license for the software product, the identification module 312 determines the type of the software product. This may involve retrieving a product identifier that uniquely identifies the software product. For example, the product identifier may identify the general product description, such as word processor, and then identify the version of the software product within the description, such as trial version, retail version, etc. Product identifiers may also include a unique serial number, however, this portion of the product identifier may be unnecessary for identifying the product type.

Product identifiers for software products may be provided in many ways. Often, every installed software product has corresponding configuration data. In one embodiment, the configuration data resides in an entry for the software product in a registry maintained by the computer system and the product identifier is included within the registry entry. In another embodiment, an identification file may be provided as part of the configuration data with each installed software product that includes the product identifier of the software product.

A searching module 304 is also provided to search the computer system for installed products of the same type. The actions performed by the searching module 304 may differ depending on how the configuration data, EULAs, and product identifiers are maintained on the computer system. For example, in the embodiment wherein configuration data is resides in a registry, after the identification module 312 retrieves the product identifier from the registry entry for the software product, the searching module 304 searches the registry for other entries of software products of the same type by comparing the product identifier of each entry with the retrieved product identifier. In an alternative embodiment, the searching module compares the retrieved product identifier to product identifier maintained in files associated with each installed software product. The searching module 304 identifies all the software products installed on the computer system having the same type as that determined by the identification module.

A comparing module 314 then identifies the EULA for each of the software products (including the software product in question) identified by the searching module 304 and compares them. The comparison identifies a best license based on criteria previously determined by the software developer. In one embodiment, the comparison includes comparing an assigned rank provided with each EULA. In the embodiment, the software developer, prior to installation, assigned ranks to the EULAs and included the rank with each license in order to facilitate the comparison.

Ranks may be assigned based on one or more criteria. For example, enterprise licenses may be given the highest rank as they traditionally convey the most rights to the user. Licenses with a perpetual term and multiple installations may be given the next highest rank. Licenses with perpetual terms but limited to a specific computer may be given a lower rank. Lastly, trial and beta licenses that have a limited term may be given the lowest rank. One skilled in the art will realize that any number of ranking criteria may be used to develop a relative rank for each license. Additionally, it should be noted that different licenses may be assigned the same rank even though the scope of rights conveyed by each license is different.

In an alternative embodiment, the comparing module 314 may compare the separate terms of each license against each other. For example, the length of the licenses (e.g., perpetual, limited to 1 year subscription, limited to 30 day trial) may be compared and the greater period selected as best. Next, the license term from each license identifying the number of computer systems on which the software may be installed may be compared and, again, the greatest term selected. To facilitate such a comparison, each term may be assigned a separate, predetermined rank. By individually comparing each term of the licenses, the comparing module may identify a set of best license terms that, in effect, represent the aggregate scope of rights of the user of the software product. Such a license could be considered a composite license as it may include terms from multiple licenses.

The comparing module 314 ultimately identifies a best license for the software product. The identified best license is then decoded (if necessary) by the generation module 306 and displayed by the GUI module 302. The generation module 306 may be unique to the type of software product. As the best license may not be the EULA associated with the software product, the generation module 306 can decode the licenses of the software products of the same type. Additionally, if the license module is a stand-alone software product and not part of a software product, then the decoding module must be able to decode all the licenses that it could potentially be called on to identify a license for.

The following discussion in reference to FIGS. 4-7 relates to an embodiment of a method of identifying software products and associating a license with each product. The discussion is provided herein as one example of how software products and their licenses may be identified in order to determine if multiple versions of the same software product are simultaneously installed on a computer system.

In the embodiment, during installation of each software product, configuration data for the software product is created that includes a product identifier that specifies the software product. This configuration data may take the form of an entry in a registry or some other form. In addition, a license file associating the product identifier with a license, called a SKU file, is stored on the computer system for each installed software product. The SKU file contains information pertaining to multiple versions of the software product. Given a product identifier, the SKU file can be indexed to obtain the information, include the license, specific to the software product identified by the product identifier. In addition to associating licenses with products, the SKU file may have other uses. For example, when the software product is executed by the computer, the product identifier of the software product is retrieved and the information associated with retrieved product identifier may be extracted from the SKU file.

To provide a detailed example, an embodiment of a product key that includes a Group ID that identifies the software product or product family and a Channel ID that identifies a specific version of the software product will be discussed in detail. In this embodiment, each specific version is licensed under a specific license to the product. Therefore, by identifying the version, the applicable license is also identified. For example, Group ID of 5 may be a word processor application, and a Channel ID of 777 may identify a retail, home version of the word processor application having a home-user license. One skilled in the art will recognize that there are other ways of associating a product identifier with specific contents of storage media, such as a specific license.

Figure 4:
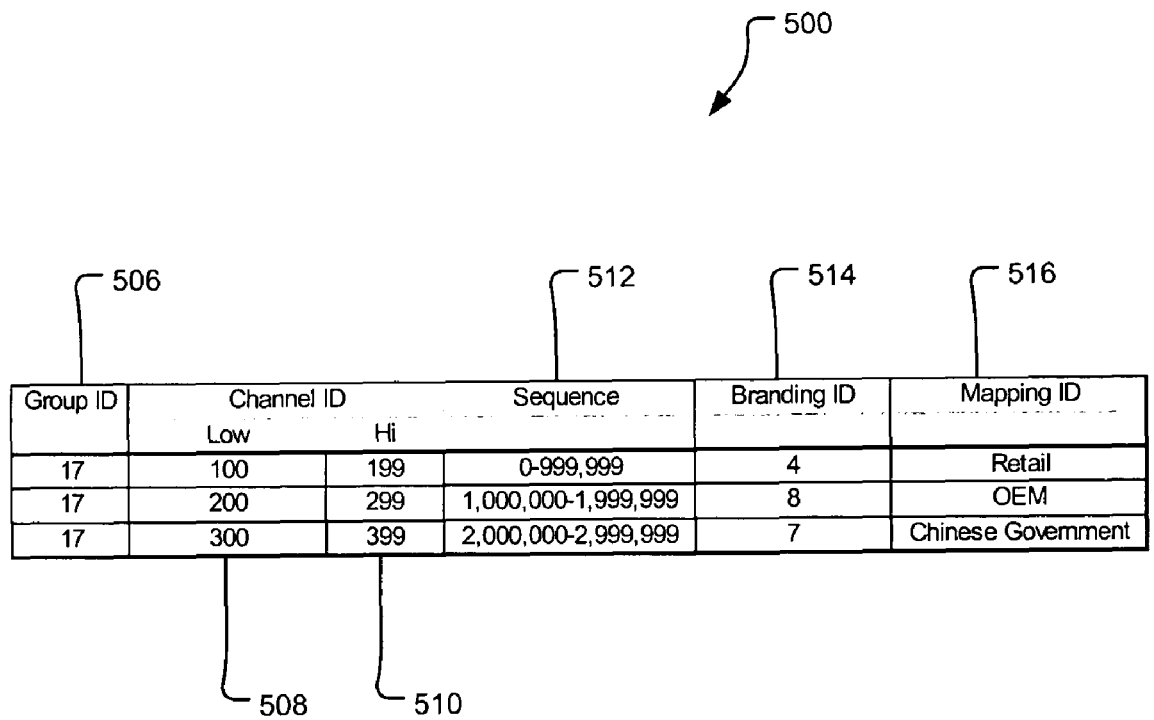
FIG. 4 presents one embodiment of a SKU table contained in a file that associates product identifiers with a specific software product and version of the product.

FIG. 4 presents one embodiment of a table 500 contained in a license file, such as a SKU file, that associates product keys in the embodiment described above with a specific product and version, each version having at least a version-specific license to the product. In order to determine the product, version and license from the product key, a license file is provided with each software product. In alternative embodiments, a single license file is maintained for the computer system that is updated upon each installation.

The table 500 shown in FIG. 4 is referred to as the SKU table 500. The SKU table 500 associates product keys with a specific product and version (and therefore license). In the embodiment shown, a column of Group IDs 506 is provided wherein each Group ID indicates a specific product. Channel IDs are contained in the lookup table 500 as two columns that identify a range: a column 508 containing the low end of the range and a column 510 for the high end of the range. Next is a column 512 that contains the sequence number of serial numbers that are valid for the range indicated by the Channel ID columns 508, 510.

Yet another column 514, referred to as the branding column 514, contains a brand ID that identifies information specific to how the version of the product is to be presented to the user. This will be discussed in greater detail with respect to the branding table in FIG. 5.

The last column 516 shown is an indicator of whether the product is a retail or OEM product. This column is referred to as the mapping column 516 and it contains mapping identifiers specific to each product version. In some embodiments, information in the mapping column can be used with the Mapping Table shown in FIG. 7 to identify the proper license, i.e., EULA, to the product. In other embodiments, the mapping column 516 is not necessary.

The mapping identifiers, in addition to possibly being used to identify the EULAs as discussed below, also may dictate specific functions of the software installed on the computer that are required under the terms of the EULA. For example, trial products may not request or prompt the user for a product key when installed. Rather, the trial product may only prompt the user to accept the terms of the trial license during installation. Alternatively, the product installation may be the same for the trial and full versions of the software product, but the trial product may be provided with a product key identifying a trial version of the software. Additional embodiments of a table 500 or similar structures for associating a product key with a version or a set of behaviors that constitute a distinct version will be apparent to one skilled in the art. The embodiment provided in FIG. 4 is provided as an example only and should not be considered as limiting the scope of the present invention.

Figure 5:
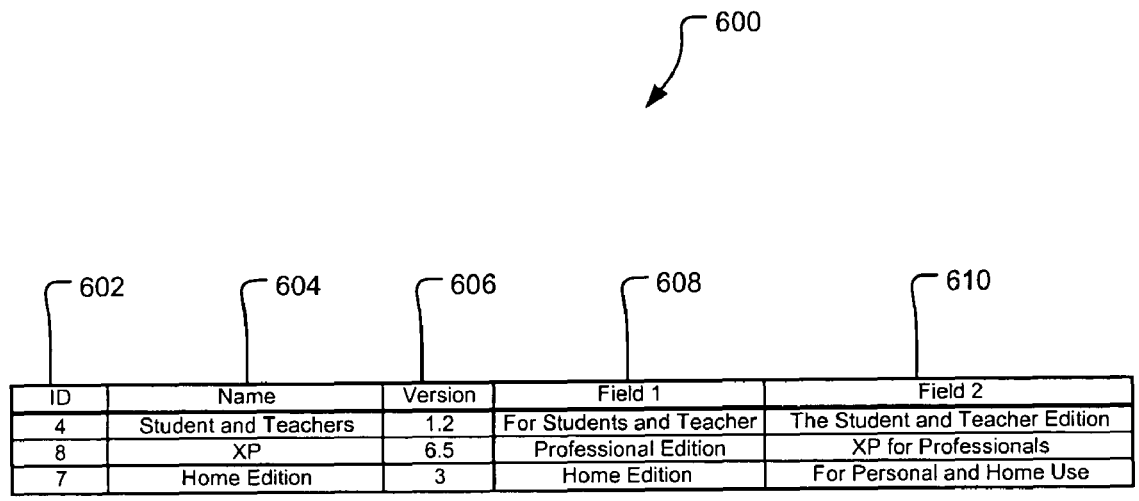
FIG. 5 presents an embodiment of a Branding Table in accordance with the present invention.

FIG. 5 presents an embodiment of a Branding Table 600. The branding table includes information concerning what text and GUIs should be displayed during execution of the product and installation. For example, a trial version of a word processor may identify in the branding table that the phrase "Trial Version" should appear in the title bar of the product when in use, or when initially executed or in the product specific information pages, such as those found via the "Help/About" pulldown menu in some products. The various user interfaces are provided with fields for the branding text to be inserted into.

In the embodiment of the Branding Table 600 shown in FIG. 5, unencoded text is provided for use in GUIs shown to the user during installation or runtime. A first ID column 602 is provided that includes a branding ID for each branded version. A name column 604 is provided that includes an unencoded name for the brand identified by the branding ID. A version column 606 is provided that identifies the version of the branding. In the embodiment shown in FIG. 5, the table 600 also includes two field columns 608 and 610 that include unencoded text for use in different fields contained in the GUIs and screens that are presented to the user either during installation or runtime. For example, each field column 608 and 610 may correspond to fields in a generic license so that when the text is inserted in the fields the license becomes specific to the product and version. Additional embodiments of a Branding Table 600 or similar structures for including and providing the branding information will be immediately suggested to one skilled in the art. The embodiment provided in FIG. 5 is provided as an example only and should not be considered as limiting the scope of the present invention.

Figure 6:
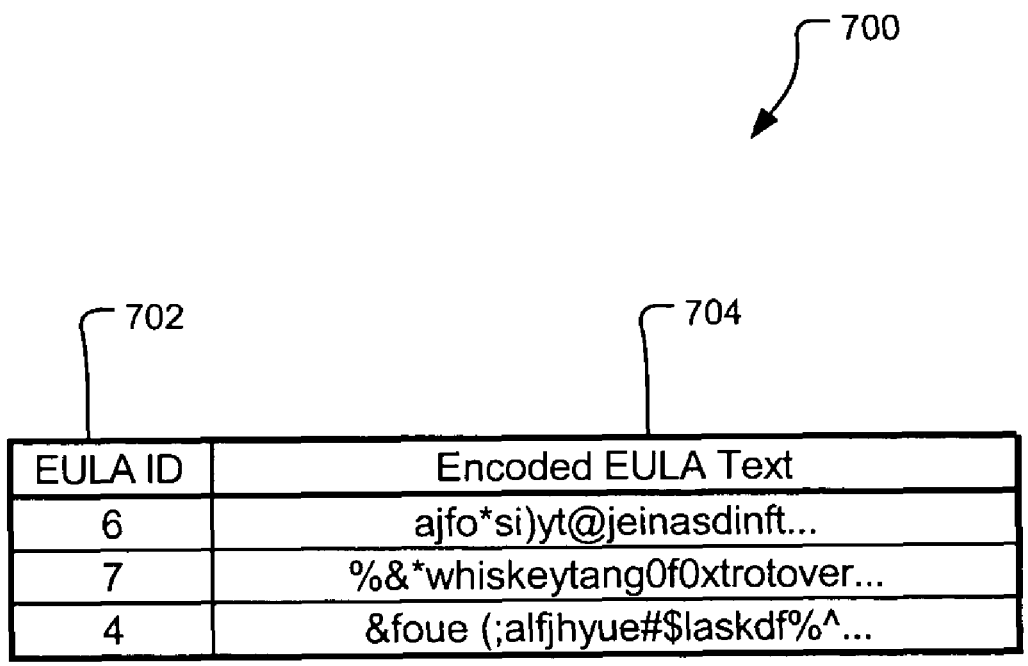
FIG. 6 presents an embodiment of a EULA Table in accordance with the present invention.

FIG. 6 presents an embodiment of another table contained in a license file, such as a SKU file, for storing the licenses. In the embodiment shown in FIG. 4, each version is associated with a to specific license known as an End-User License Agreement (EULA). Each version of a software product is sold under a EULA. This may be true even if the only difference between two versions is the EULA. However, multiple versions may share the same EULA. For example, the trial version of different products may all use the same generic trial EULA. Thus, the EULAs stored in the SKU file may be generic in form.

Embodiments of the SKU file may contain the table 700 that contains the EULAs for and associates each EULA with the various versions that may be installed. The EULA Table 700 is a simple two-column table having a EULA identifier in one column 702 and containing a base 64 encoded EULAs in the other column 704. Thus, in this embodiment the EULAs are protected and not in a form directly accessible by a user. Encoding the EULAs using base 64 encoding is just one example of a protected form of a EULA. Many other ways to provide data such as EULAs in a protected form so that access to the data is controlled are well known in the art and are broadly applicable here.

The license module obtains the appropriate EULA identifier by consulting one or more of the other tables 500, 600 and 800 in the file and indexing the table with the product key (in this embodiment the Group ID and Channel ID). Then using the EULA Table 700, the license module extracts and decodes the appropriate EULA for display to a user. Additional embodiments of a EULA table 700 or similar structures for identifying and providing EULAs specific to various versions of software products will be immediately suggested to one skilled in the art. The embodiment provided in FIG. 6 is provided as an example only and should not be considered as limiting the scope of the present invention.

Figure 7:
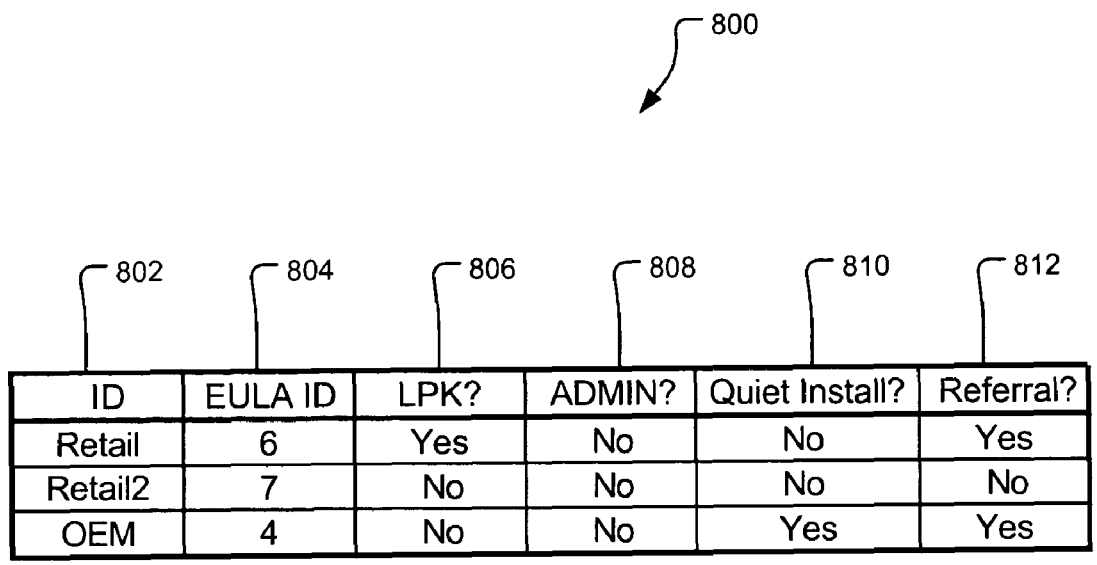
FIG. 7 presents an embodiment of a Mapping Table in accordance with the present invention.

FIG. 7 presents another table 800, a Mapping Table 800, that may be found in a license file such as the SKU file 18. In the embodiment shown, the Mapping Table 800 identifies certain behaviors of the various versions of the software products listed on the table 800 and, presumably, stored on the storage media. The Mapping Table 800 includes one column 802 for the mapping identifier and a second column 804 for the EULA ID associated with each mapping identifier. In addition, the Mapping Table 800 includes additional columns that identify other behaviors. A "LPK?" column 806 is provided that identifies whether an extended set of languages, known as a language pack, should be installed with each version of the software product. An "ADMIN?" column 808 is includes that identifies whether the administrator is the only user to have rights to change the configuration of the software product after installation. A "Quiet Install?" column 810 identifies whether any screens are presented to the installing consumer during installation, such as the product key input screen. A "Referral?" column 812 is also provided.

An alternative embodiment of the Mapping Table 800 may be another simple two-column table that associates the identifiers found in the mapping column 516 of the SKU table 500 with a EULA ID. The mapping table includes one column 802 for the mapping identifier and a second column 804 for the EULA ID associated with each mapping identifier. Additional embodiments of a Mapping Table 800 or similar structures for identifying the behaviors included in a version will be immediately suggested to one skilled in the art. The embodiment provided in FIG. 7 is provided as an example only and should not be considered as limiting the scope of the present invention.

In embodiments of the present invention the SKU file is copied in its entirety onto the computer as part of the installation process for each software product. In other embodiments, it is consulted and only selected portions of the contents of the file (such as the potentially applicable EULAs, associated limitation information, any branding information, etc.) are copied onto the computer during installation. One skilled in the art will recognize that many different ways of providing a file that associates the product key with specific branding, mapping, and EULA behaviors are possible and that the above is but one example. In addition, one skilled in the art will recognize that, in addition to providing a license file, there are many analogous and functionally equivalent ways to perform and support the same functions performed and supported by the SKU file embodiment.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 8:
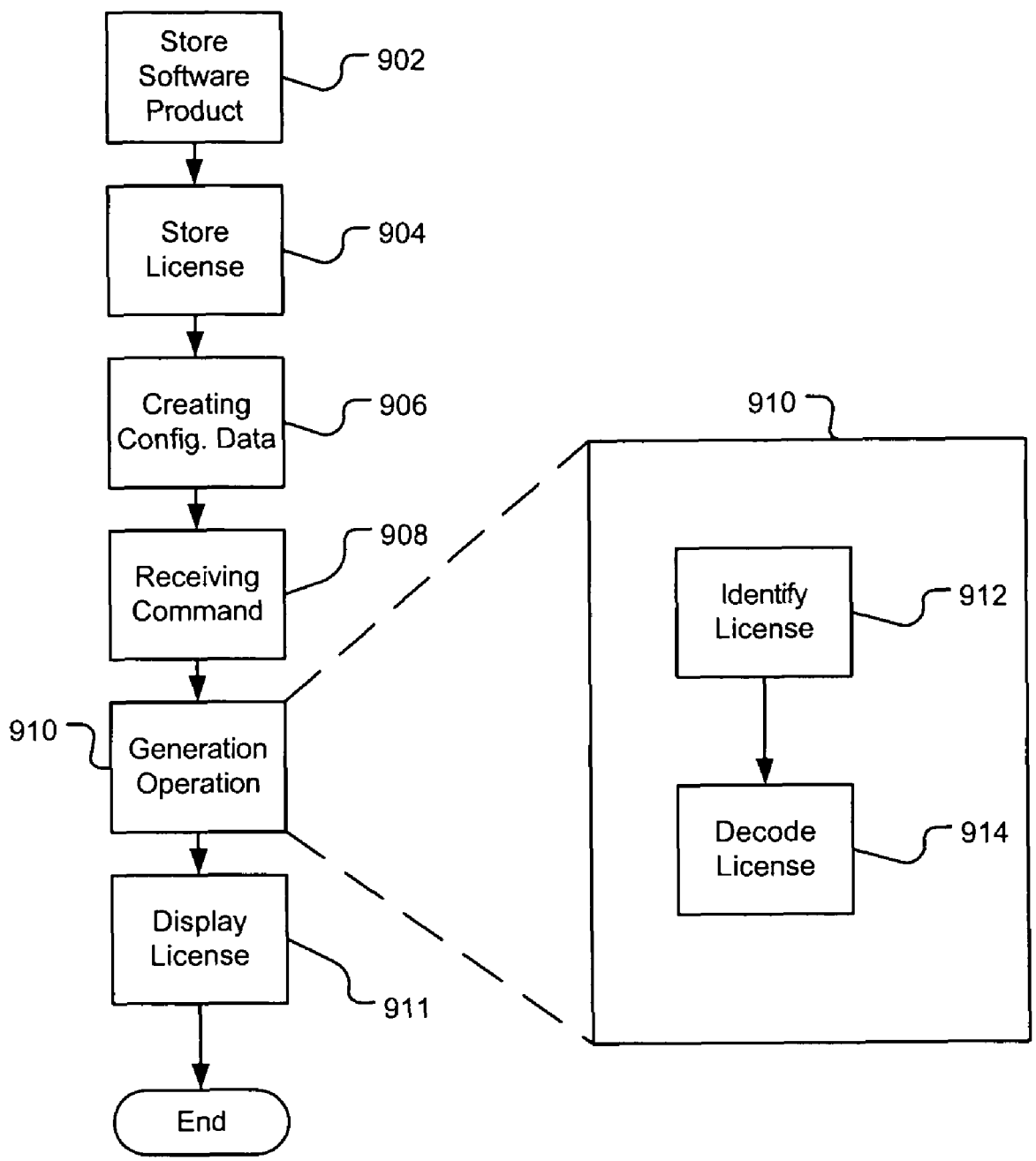
FIG. 8 presents the logical operations for identifying the license of an installed software product in accordance with an embodiment of the present invention wherein the software product licenses are stored on the computer in a protected form.

FIG. 8 presents the logical operations for identifying the license of an installed software product in accordance with an embodiment of the present invention wherein the software product licenses are stored on the computer in a protected form.

In the embodiment, a software product is installed on a computer system. As part of the initial installation a storing operation 902 stores the executable code for the software product on the computer system, for example by copying it from a removable storage media such as CD-ROM.

In addition, the installation includes a license storing operation 904 that stores a license for the software product on the computer system. The license is stored in a protected form. As discussed above, the protected form may be an encoded form of the license, such as a base 64 encoding of an otherwise displayable form of a license (such as a text or html form easily renderable by a multitude of applications). Many other ways of providing data in a protected form to control access are well known in the art, base-64 being just one example of a simple protected form. Any protected form or protection scheme may be used, so long as the licensing module is provided with the means to access the protected form and create the displayable form. Storing all licenses in such a form prevents a user from inadvertently accessing the wrong license, in essence by limiting the user's access such that licenses are only accessible through a license module. The storing operation 904 may also include storing a license file, such as a SKU file, on the computer system that contains the protected form of the license for the software product. Note that although the SKU file may contain multiple licenses, only one license applies to the software product.

A configuration data operation 906 is also included that creates configuration data, for example a registry entry, a configuration file or both, for the software product during initial installation. The configuration data may include a product key that identifies the type of the software product, e.g., its group ID and channel ID. In an alternative embodiment, the configuration data also includes a copy of the protected form of the license.

The initial installation of the software product may also include other operations (not shown) such as generating a displayable form of the license from the protected form and displaying it to the user for acceptance.

At some point after installation, a license module, for example a license module provided as part of a software product, receives a user command in a receiving operation 908 to display the license applicable to the software product. The command may be received by a GUI module within the license module, or it may be received by the software product and forwarded to the license module.

The license module, in response to the user command, creates a displayable form of the license from the protected form stored on the computer system in a generation operation 910. This may include several operations 912, 914, 918 such as identifying the proper license to be displayed in an identification operation 912 and decoding or otherwise generating a displayable form of the license from the protected form in a decoding operation 914.

After a displayable form of the license has been generated, a display operation 911 displays the license to the user. This may include displaying, via the GUI module, the displayable form of the license. Alternatively, the displaying may include sending the displayable form of the license to a connected printer for printing.

The embodiment described in FIG. 8 prevents users from accessing the licenses of software products, except under controlled circumstances that prevent the user from identifying the license with the wrong software product. The embodiment also allows a generic license that may be applicable to multiple versions of different software applications to be displayed in a form that positively identifies the installed software product it is associated with on the user's computer system.

Figure 9:
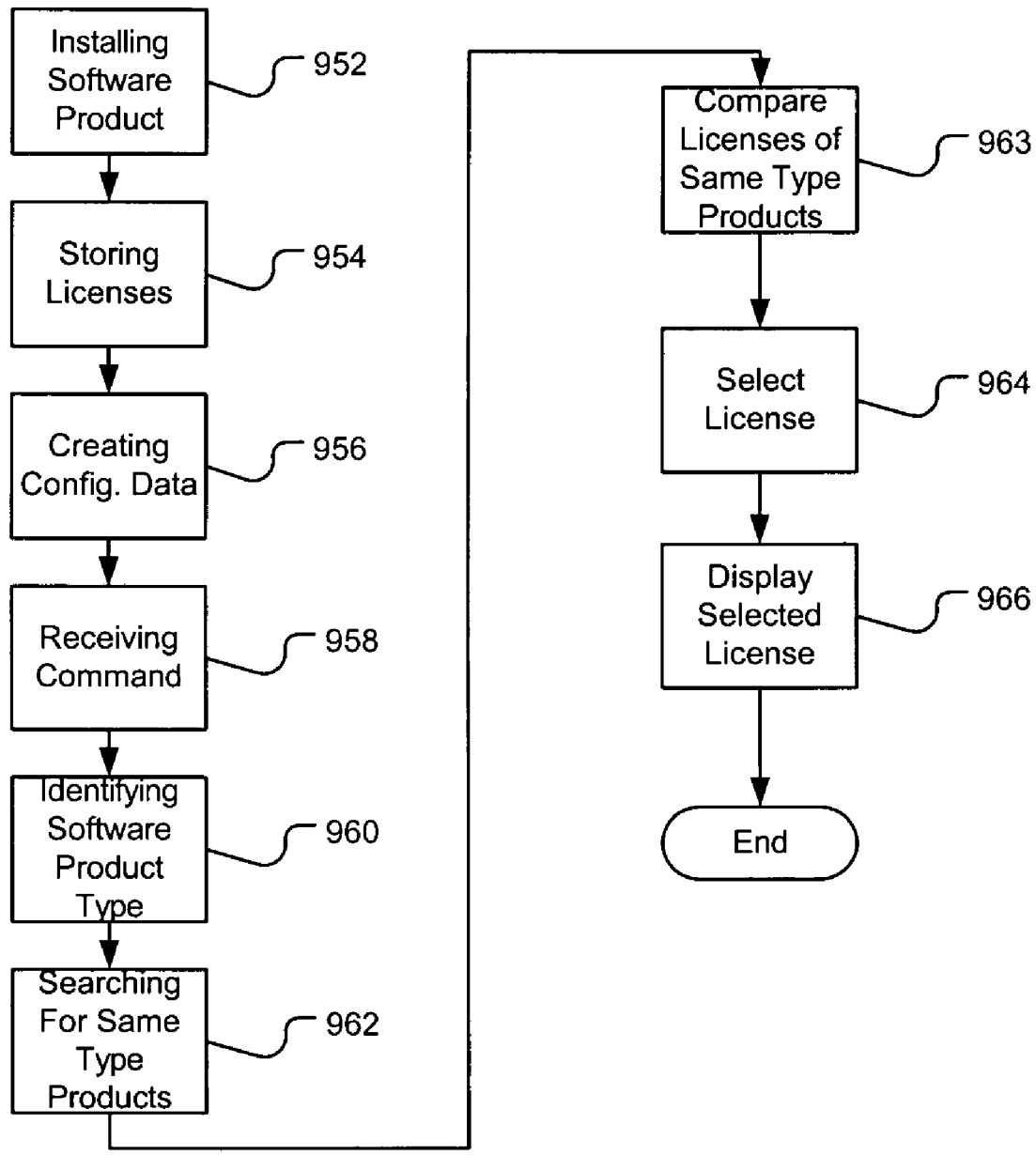
FIG. 9 presents the logical operations for identifying a license for an installed software product in accordance with another embodiment of the present invention wherein the multiple software products of the same type, but with different licenses, are installed on the computer system.

FIG. 9 presents the logical operations for identifying a license for an installed software product in accordance with another embodiment of the present invention wherein the multiple software products of the same type, but with different licenses, are installed on the computer system.

In the embodiment shown in FIG. 9, multiple software products are installed on the computer system. As part of the initial installation a storing operation 952 stores the executable code for each software product on the computer system, for example by copying it from a removable storage media such as CD-ROM.

In addition, the installation includes a license storing operation 954 that stores a license for each software product on the computer system. The storing operation 954 may include storing a license file, such as a SKU file, on the computer system that contains the protected form of the license for the software product. Note that although the SKU file may contain multiple licenses, only one license applies to the software product. Alternatively or in addition to the SKU file, a license for each software product may be stored in a registry entry or with other configuration data as discussed below.

A configuration data operation 956 is also included that creates configuration data, such as a registry entry for each software product during initial installation. The configuration data include a product key that identifies the type of each software product, e.g., the group ID and channel ID of the software product associated with each entry. The configuration data also include a copy of the license.

The initial installation of the software product may also include other operations (not shown) such as generating a displayable form of the license from the protected form and displaying it to the user for acceptance.

At some point after installation, a license module, for example a license module provided as part of a first software product, receives a user command in a receiving operation 958 to display the license applicable to the software product. The command may be received by a GUI module within the license module, or it may be received by the software product and forwarded to the license module.

The license module, in response to the user command, identifies the first software product for which the user desires to see a license in an identification operation 960. The identification operation 960 obtains a product identifier for the first software product. As discussed above, the product identifier may be obtained from the configuration data for the software product, from a file associated with the software product, or from data embedded in the executable code of the software product.

Regardless of its source, the product identifier is then used by a searching operation 962 that searches the computer system for other installed software products of the same type as the first software product. This may include searching one or more registry entries or other configuration data for the other software products, files associated with the other software products, or data embedded in the executable code of the other software products.

It should be understood that determining whether software products are the same may be accomplished in many ways and any are applicable here. For example, if product identifiers include a serial number, then the serial numbers may be disregarded when searching the product identifiers of other software products. Alternatively, identification of what software products are of what type may be done as part of the installation process and a list maintained, for example in the registry, that lists the installed software products by type. In which case, the searching operation 962 may be as simple as indexing the list with the product identifier. Other methods of identifying installed software products of the same type are possible and will be suggested to those in the art; all of which are broadly applicable here.

Installed software products that are the same type are identified by the searching operation 962 and their licenses are identified. The licenses are then compared in a comparing operation 963. The comparison may take many forms. In an example described above, each license is provided with a predetermined rank that was previously assigned to each license by the software developer. In that example, the software developer, after creating the licenses for and associating them with each software product, evaluates each license relative to the other licenses. The evaluation may be based on predetermined criteria, such as those described above, to determine a relative rank for each license. This rank may then be included with the license or more may be associated with the license in some fashion understood by the license module.

A selection operation 964 selects one license based on the results of the comparing operation 963. For example, if the ranks are provided as a numerical scale, say 1-5, the selection operation 964 may select the license with the highest or lowest rank. Alternatively, the ranks may be provided by name, i.e. "enterprise," "perpetual," "trial," "beta," "broken," etc. In which case, the selection operation 964 may require a consultation with a lookup table to determine which of the licenses to select. Regardless of the mechanics of the selection, the selection operation 964 identifies a single license that the software developer has chosen (via the predetermined ranking) to be the appropriate and applicable license for the first software product based on the other software products installed on the computer. The selected license may be any of the licenses associated with any of the other software products having the same type as the first software product.

The selected license is then presented to the user in a displaying operation 966. Note that, as discussed above, the displaying operation 966 may perform many actions. For example, the license may need to be decoded or its form modified before display via a GUI module.

The embodiment described in FIG. 9 prevents users from misidentifying licenses when there are multiple software products of the same type installed on their computer systems. The embodiment also allows software developers to determine what licenses, and thus license terms, should apply based on the software products installed on the computer system. The embodiment also allows a generic license that may be applicable to multiple versions of different software applications to be displayed in a form that positively identifies the installed software product it is associated with on the user's computer system.

Figure 10:
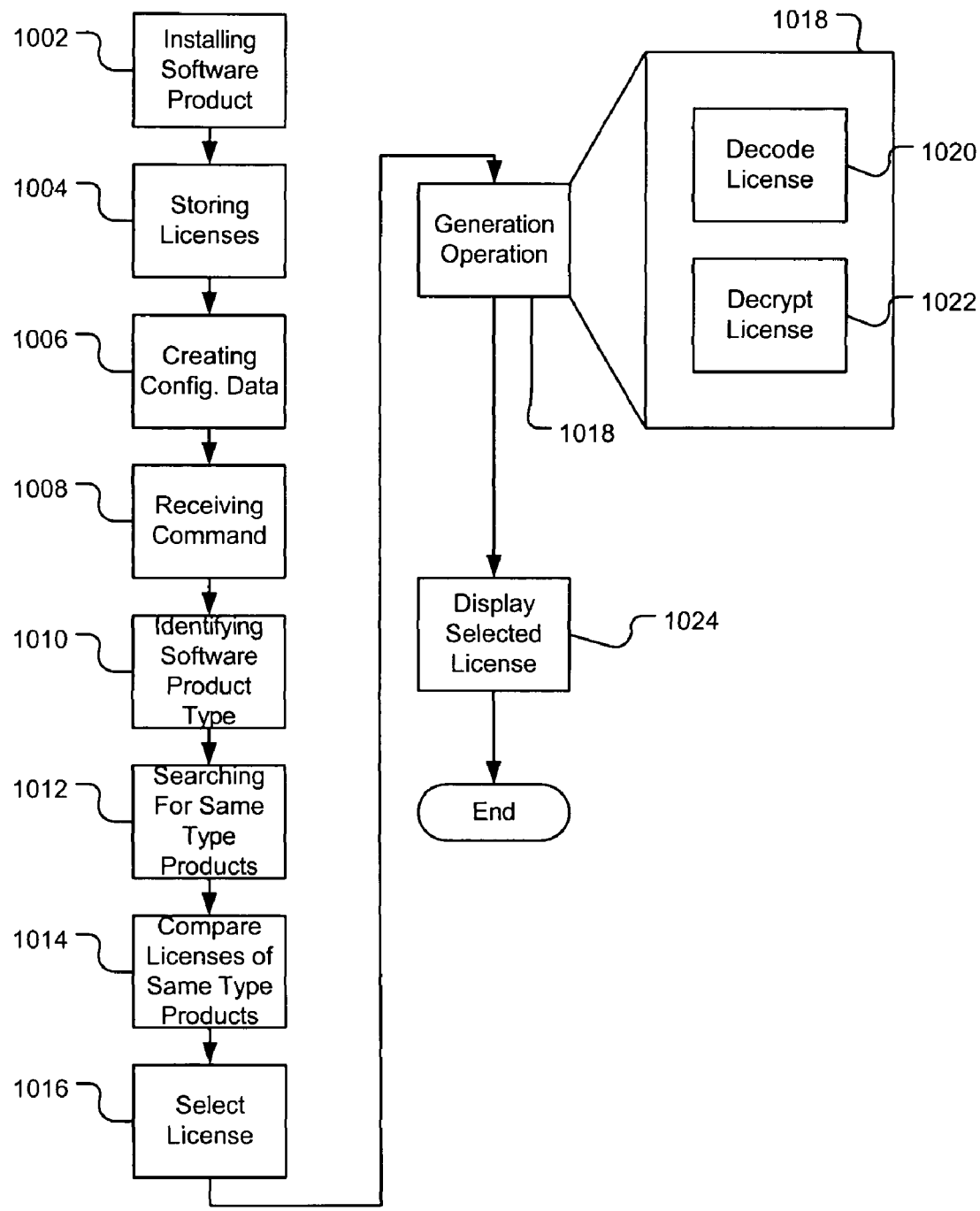
FIG. 10 presents the logical operations for identifying the license of an installed software product in accordance with an embodiment of the present invention wherein the software product licenses are stored on the computer in a protected form and wherein their may be multiple software products of the same type, but with different associated licenses on computer system.

FIG. 10 presents the logical operations for identifying the license of an installed software product in accordance with an embodiment of the present invention wherein the software product licenses are stored on the computer in a protected form and wherein there may be multiple software products of the same type, but with different associated licenses on computer system.

In the embodiment, a software product is installed on a computer system. As part of the initial installation a storing operation 1002 stores the executable code for the software product on the computer system, for example by copying it from a removable storage media such as CD-ROM.

In addition, the installation includes a license storing operation 1004 that stores a license for the software product on the computer system. Again, as discussed above the license is stored in a protected form. Storing all licenses in such a form prevents a user from inadvertently accessing the wrong license, in essence by limiting the user's access such that licenses are only accessible through a license module. The storing operation 1004 may also include storing a license file, such as a SKU file, on the computer system that contains the protected form of the license for the software product. Note that although the SKU file may contain multiple licenses, only one license applies to the software product.

In addition to being stored in a protected form, each license is provided with a predetermined rank that was previously assigned to each license by the software developer. In that example, the software developer, after creating the licenses for and associating them with each software product, evaluates each license relative to the other licenses. The evaluation may be based on predetermined criteria, such as those described above, to determine a relative rank for each license. This rank may then be included with the license or more may be associated with the license in some fashion understood by the license module.

A configuration data operation 1006 is also included that creates configuration data, such as a registry entry, for the software product during initial installation. The configuration data may include a product key that identifies the type of the software product, e.g., its group ID and channel ID. In an alternative embodiment, the configuration data also includes a copy of the protected form of the license.

The initial installation of the software product may also include other operations (not shown) such as generating a displayable form of the license from the protected form and displaying it to the user for acceptance.

At some point after installation, a license module, for example a license module provided as part of a first software product, receives a user command in a receiving operation 1008 to display the license applicable to the software product. The command may be received by a GUI module within the license module, or it may be received by the software product and forwarded to the license module.

The license module, in response to the user command, identifies the first software product for which the user desires to see a license in an identification operation 1010. The identification operation 1010 obtains a product identifier for the first software product. As discussed above, the product identifier may be obtained from the registry entry or other configuration data for the software product, from a file associated with the software product, or from data embedded in the executable code of the software product.

Regardless of its source, the product identifier is then used by a searching operation 1012 that searches the computer system for other installed software products of the same type as the first software product. This may include searching one or more registry entries or configuration data for the other software products, files associated with the other software products, or data embedded in the executable code of the other software products.

It should be understood that determining whether software products are the same may be accomplished in many ways and any are applicable here. For example, if product identifiers include a serial number, then the serial numbers may be disregarded when searching the product identifiers of other software products. Alternatively, identification of what software products are of what type may be done as part of the installation process and a list maintained, for example in the registry, that lists the installed software products by type. In which case, the searching operation 1012 may be as simple as indexing the list with the product identifier. Other methods of identifying installed software products of the same type are possible and will be suggested to those in the art; all of which are broadly applicable here.

Installed software products that are the same type are identified by the searching operation 1012 and their licenses are identified. The licenses are then compared in a comparing operation 1014. The comparison may take many forms. In an example described above, each license is provided with a predetermined rank that was previously assigned to each license by the software developer. In that example, the software developer, after creating the licenses for and associating them with each software product, evaluates each license relative to the other licenses. The evaluation may be based on predetermined criteria, such as those described above, to determine a relative rank for each license. This rank may then be included with the license or may be associated with the license in some fashion understood by the license module. The ranking scheme itself may change from version to version and product to product as determined by the software developer. Alternative ways of comparing the licenses are also possible, such as by comparing the date of the license or the provisions in the license.

A selection operation 1016 selects one license based on the results of the comparing operation 1014. For example, if the ranks are provided as a numerical scale, say 1-5, the selection operation 1016 may select the license with the highest or lowest rank. Alternatively, the ranks may be provided by name, i.e. "enterprise," "perpetual," "trial," "beta," "broken," etc. In which case, the selection operation 1016 may require a consultation with a lookup table to determine which of the licenses to select. Regardless of the mechanics of the selection, the selection operation 1016 identifies a single license that the software developer has chosen (via the predetermined ranking) to be the appropriate and applicable license for the first software product based on the other software products installed on the computer. The selected license may be any of the licenses associated with any of the other software products having the same type as the first software product.

One skilled in the art will recognize that the identification operation 1010, searching operation 1012, comparing operation 1014, and selection operation 1016 could be broadly considered and implemented as a single operation (not shown) of identifying the right license for the first software product.

Even though the license has been selected, it cannot yet be displayed because it is a protected form. Prior to display, the license module must generate a displayable form of the selected license in a generation operation 1018. The generation operation 1018 may include obtaining branding text for the software product and displaying it with the license, for example in a title bar on the interface, thus positively identifying the software product with the displayed license. Again, the generation operation 1018 may include several other operations depending on the form in which the licenses are stored. In the embodiment shown, the generation operation includes decoding or otherwise generating a displayable form of the license from the protected form in a decoding operation 1020. The reader will understand that the decoding operation 1020 broadly refers to the operation of accessing the protected form of the license to generate a displayable form. Whether an actual decoding operation is necessary is dependent on what the protected form is. Alternative embodiments are also possible, such as including a decrypting operation 1022 to decrypt licenses stored in an encrypted form.

After a displayable form of the license has been generated, a display operation 1024 displays the license to the user. This may include displaying, via the GUI module, the displayable form of the license. Branding text may also be obtained for the software product and displayed with the license, thus, positively identifying the license with the software product. Alternatively, the displaying may include sending the displayable form of the license to a connected printer for printing.

The embodiment described in FIG. 10 provides the benefits associated with both the embodiment described in FIG. 8 and the embodiment described in FIG. 9. It prevents users from misidentifying licenses when there are multiple software products of the same type installed on their computer systems and also prevents users from accessing the licenses of software products, except under controlled circumstances that prevent the user from identifying the license with the wrong software product. The embodiment also allows software developers to determine what licenses, and thus license terms, should apply based on the software products installed on the computer system. The embodiment also allows a generic license that may be applicable to multiple versions of different software applications to be displayed in a form that positively identifies the installed software product it is associated with on the user's computer system.

Thus, the present invention is presently embodied as a method, apparatus, computer program product or computer readable media encoding a computer program for preventing users from misidentifying the license of an installed software product. The invention is also applicable to identifying the appropriate license of an installed software product when there are multiple software products of the same type installed on the computer system, preventing a user from accessing the licenses of software products, except under controlled circumstances. Such control prevents the user from identifying the license with the wrong software product, allowing software developers to determine what licenses, and thus license terms, should apply based on the software products installed on a computer system, and allowing a generic license that may be applicable to multiple versions of different software applications to be displayed in a form that positively identifies the installed software product it is associated with on the user's computer system.

While the invention has been particularly shown and described with reference to preferred embodiments thereof, it will be understood by those skilled in the art that various other changes in the form and details may be made therein without departing from the spirit and scope of the invention.

What is claimed is:

1. A system comprising:
   a processor; and
   a memory having computer executable instructions stored thereon, the computer executable instructions programmed to:
   provide a first encrypted software license for a first version of a software product on a computing system, wherein the first encrypted software license has a rank;
   receive a request to access a software license for the first version of the software product;
   prior to providing user access to any software license for the first version of the software product:
   obtain, at the software licensing module, a product identifier that indicates a software product type of the first version of the software product;
   search the computing system and identifying at least a second version of the software product that includes the same software product type indicated by the product identifier;
   based on the identified second version of the software product, identify a second encrypted software license stored on the computer system, wherein the second encrypted software license is for the identified second version of the software product, wherein the second encrypted software license has a rank;

compare the rank of the first encrypted software license to the rank of the second encrypted software license to determine which of the first encrypted software license and the second encrypted software license includes a higher ranked license and to determine which of the first encrypted software license and the second encrypted software license includes a lesser ranked license;

decrypt the higher ranked license; and after the decryption, provide user access to the decrypted higher ranked license while not providing access to the lesser ranked license.

2. The system of claim 1, wherein the rank of the first encrypted software license and the rank of the second encrypted software license are at least one member of a group comprising: a pregenerated software developer rank, and a rank based on a term comparison of the first encrypted software license and the second encrypted software license.

3. The system of claim 1, wherein the product identifier of the first version of the software product includes a software product description.

4. The system of claim 1, wherein searching the computing system and identifying the second version of the software product that includes the same software product type indicated by the product identifier includes accessing a SKU file and matching the product identifier to a product identifier of the second version of the software product located in the SKU file.

5. The system of claim 1, wherein the broader license is at least one member of a group comprising: the first encrypted software license and the second encrypted software license.

6. The system of claim 1, wherein the product identifier of the first version of the software product is obtained from configuration data of the first version of the software product.

7. The system of claim 1, wherein the product identifier of the first version of the software product is obtained from a system registry of the first version of a the software product.

8. A computer-implemented method comprising:

providing a first encrypted software license for a first version of a software product on a computing system, wherein the first encrypted software license has a rank;

receiving a request to access a software license for the first version of the software product;

obtaining, at the software licensing module, a product identifier that indicates a software product type of the first version of the software product;

searching the computing system and identifying at least a second version of the software product that includes the same software product type indicated by the product identifier;

based on the identified second version of the software product, identifying a second encrypted software license stored on the computer system, wherein the second encrypted software license is for the identified second version of the software product, wherein the second encrypted software license has a rank;

comparing the rank of the first encrypted software license to the rank of the second encrypted software license to determine which of the first encrypted software license and the second encrypted software license includes a higher ranked license and to determine which of the first encrypted software license and the second encrypted software license includes a lesser ranked license;

decrypting the higher ranked license; and providing user access to the decrypted higher ranked license while not providing access to the lesser ranked license.

9. The computer-implemented method of claim 8, wherein the rank of the first encrypted software license and the rank of the second encrypted software license are at least one member of a group comprising: a pregenerated software developer rank, and a rank based on a term comparison of the first encrypted software license and the second encrypted software license.

10. The computer-implemented method of claim 8, wherein the product identifier of the first version of the software product includes a software product description.

11. The computer-implemented method of claim 8, wherein searching the computing system and identifying the second version of the application that includes the same software product type indicated by the product identifier includes accessing a SKU file and matching the product identifier to a product identifier of the second version of the software product located in the SKU file.

12. The computer-implemented method of claim 8, wherein the broader license is at least one member of a group comprising: the first encrypted software license and the second encrypted software license.

13. The computer-implemented method of claim 8, wherein the product identifier of the first version of the software product is obtained from configuration data of the first version of the software product.

14. The computer-implemented method of claim 8, wherein the product identifier of the first version of the software product is obtained from a system registry of the first version of an software product.

15. A computer-readable storage medium having computer executable instructions, the instructions comprising:

providing a first encrypted software license for a first version of a software product on a computing system, wherein the first encrypted software license has a rank;

receiving a request to access a software license for the first version of the software product;

obtaining, at the software licensing module, a product identifier that indicates a software product type of the first version of the software product;

searching the computing system and identifying at least a second version of the application that includes the same software product type indicated by the product identifier;

based on the identified second version of the application, identifying a second encrypted software license stored on the computer system, wherein the second encrypted software license is for the identified second version of the software product, wherein the second encrypted software license is associated with a rank;

comparing the rank of the first encrypted software license to the rank of the second encrypted software license to determine which of the first encrypted software license and the second encrypted software license includes a higher ranked license and to determine which of the first encrypted software license and the second encrypted software license includes a lesser ranked license;

decrypting the higher ranked license; and providing user access to the decrypted higher ranked license while not providing access to the lesser ranked license.

16. The computer-readable storage medium of claim 15, wherein the rank of the first encrypted software license and the rank of the second encrypted software license are at least one member of a group comprising: a pregenerated software developer rank, and a rank based on a term comparison of the first encrypted software license and the second encrypted software license.

17. The computer-readable storage medium of claim 15, wherein the product identifier of the first version of the software product includes a software product description.

18. The computer-readable storage medium of claim 15, wherein searching the computing system to identify the second version of the application that includes the same software product type indicated by the product identifier includes accessing a SKU file and matching the product identifier to a product identifier of the second version of the application located in the SKU file.

19. The computer-readable storage medium of claim 15, wherein the broader license is at least one member of a group comprising: the first encrypted software license and the second encrypted software license.

20. The computer-readable storage medium of claim 15, wherein the product identifier of the first version of the software product is obtained from configuration data of the first version of the software product.

21. The computer-readable storage medium of claim 15, wherein the product identifier of the first version of the software product is obtained from a system registry of the first version of an software product.

* * * * *